(12) United States Patent
Shao (10) Patent No.: US 12,429,855 B2
(45) Date of Patent: Sep. 30, 2025

(54) INDUSTRIAL INTERNET OF THINGS SERVICE INFORMATION PROCESSING SYSTEM BASED ON SERVICE CLOUD PLATFORM AND METHOD THEREOF

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/017,763

(22) Filed: Jan. 12, 2025

(65) Prior Publication Data

US 2025/0147490 A1 May 8, 2025

(30) Foreign Application Priority Data

Dec. 3, 2024 (CN) .......................... 202411756402.4

(51) Int. Cl.
 *G05B 19/418* (2006.01)
 *G16Y 40/10* (2020.01)
 *G16Y 40/50* (2020.01)

(52) U.S. Cl.
 CPC .......... *G05B 19/4185* (2013.01); *G16Y 40/10* (2020.01); *G16Y 40/50* (2020.01)

(58) Field of Classification Search
 CPC .... G05B 19/4185; G16Y 40/10; G16Y 40/50; H04L 67/125; H04L 63/10; H04L 67/51; H04L 67/55
 See application file for complete search history.

(56) References Cited

U.S. PATENT DOCUMENTS

| 2023/0216922 A1* | 7/2023 | Ardiri | H04L 47/36 |
| | | | 709/223 |
| 2023/0229708 A1 | 7/2023 | Ito et al. | |
| 2025/0181671 A1* | 6/2025 | Zoldi | G06F 17/18 |

FOREIGN PATENT DOCUMENTS

| CN | 114548435 A | 5/2022 |
| CN | 115047834 A | 9/2022 |

(Continued)

OTHER PUBLICATIONS

Jiang, Zhiwen, Application of Big Data Analysis Technology in Data Center Operation and Maintenance, China Computer &Communication, 15: 155-156, 2018.

*Primary Examiner* — Soe Hlaing
(74) *Attorney, Agent, or Firm* — Porus IP LLC (57) ABSTRACT

Industrial internet of things (IoT) service information processing system based on service cloud platform and method thereof, the systems including an industrial IoT subsystem and a service cloud platform. The industrial IoT user platform is configured to receive the user's application data and upload it to the industrial IoT service platform; the industrial IoT service platform is configured to generate the second data based on first data and upload it to the service cloud platform; the industrial IoT management platform is configured to determine the monitoring operation instruction and send it to the industrial IoT perception and control platform; the industrial IoT perception and control platform is configured to obtain the first data and upload to the industrial IoT service platform; the control center is configured to determine service data and recommended operation data, and send them to the industrial IoT service platform.

8 Claims, 5 Drawing Sheets

(56) References Cited

FOREIGN PATENT DOCUMENTS

| CN | 118012014 A | 5/2024 |
|---|---|---|
| CN | 118732629 A | 10/2024 |

* cited by examiner

INDUSTRIAL INTERNET OF THINGS SERVICE INFORMATION PROCESSING SYSTEM BASED ON SERVICE CLOUD PLATFORM AND METHOD THEREOF

CROSS-REFERENCE TO RELATED APPLICATIONS

This application claims priority to Chinese Patent Application No. 202411756402.4, filed on Dec. 3, 2024, the contents of which are hereby incorporated by reference to its entirety.

TECHNICAL FIELD

The present disclosure relates to the technical field of industrial Internet of Things (IoT), and in particular, to industrial internet of things service information processing system based on a service cloud platform and method thereof.

BACKGROUND

With the advent of the industry 4.0 era, industrial Internet of Things (IoT) has become a key force in promoting the intelligent transformation of the manufacturing industry. In the production line based on the Industrial IoT, various sensors, smart devices, and control systems are connected to each other to form a highly integrated and data-driven production system. However, it has become an important challenge in the actual application of industrial IoT about how to perform feature extraction and categorization of users, how to prioritize and process information about different users and services, how to obtain service data from different industrial IoTs to categorize, extract feature, and apply to ensure stable operation and global scheduling of the production line.

In view of the above, it is desired to provide a system and a method for processing service information of industrial internet of things based on a service cloud platform, which can provide users with more accurate service data as a reference.

SUMMARY

One or more embodiments of the present disclosure provide an industrial internet of things service information processing system based on a service cloud platform. The system comprises an industrial internet of things subsystem and a service cloud platform. The industrial internet of things subsystem includes an industrial internet of things user platform, an industrial internet of things service platform, an industrial internet of things management platform, an industrial internet of things sensing network platform, and an industrial internet of things perception and control platform. The industrial internet of things user platform is configured to receive application data of users, upload the application data to the industrial internet of things service platform, and in response to receiving service data, display the service data to the users. The industrial internet of things service platform is configured to perform desensitization processing on first data to generate second data, and upload the second data and the application data to the service cloud platform, the first data being data generated during a production process. The service cloud platform includes an edge device, a central device, a service database, and a control center, and the control center is configured to: determine calculation parameters based on the application data, the calculation parameters including at least one of edge calculation and center calculation; control, based on a target database, a target computing terminal with the calculation parameters to perform following operations: determining the service data based on the second data and the application data, the service data being data of at least one data type provided to the users; determining recommended operation data based on the service data and the application data, the recommended operation data including operation parameters of monitoring devices, the operation parameters including at least one of a data uploading frequency and a data precision; and sending the recommended operation data and the service data to the industrial internet of things service platform. The industrial internet of things management platform is configured to determine a monitoring operation instruction based on the recommended operation data in response to receiving an operation execution instruction sent from the industrial internet of things user platform and send the monitoring operation instruction to the industrial internet of things perception and control platform. The industrial internet of things perception and control platform includes the monitoring devices, the monitoring devices deployed in a production line is configured to monitor the production process based on the monitoring operation instruction to obtain the first data and upload the first data to the industrial internet of things service platform.

One or more embodiments of the present disclosure provide an industrial internet of things service information processing method based on a service cloud platform. The method is performed by an industrial internet of things service information processing system. The method comprises: receiving, by an industrial internet of things user platform, application data of users, uploading the application data to an industrial internet of things service platform, and in response to receiving service data, displaying the service data to the users; performing, by the industrial internet of things service platform, desensitization processing on first data to generate second data, and uploading the second data and the application data to a service cloud platform, the first data being data generated during a production process; determining, by a control center of the service cloud platform, calculation parameters based on the application data, the calculation parameters including at least one of edge calculation and center calculation; controlling, by the control center, a target computing terminal, based on a target database, with the calculation parameters to perform following operations: determining the service data based on the second data and the application data, the service data being data of at least one data type provided to the users; determining recommended operation data based on the service data and the application data, the recommended operation data including operation parameters of monitoring devices, the operation parameters including at least one of a data uploading frequency and a data precision; and sending the recommended operation data and the service data to the industrial internet of things service platform; determining, by the industrial internet of things management platform, a monitoring operation instruction based on the recommended operation data in response to receiving an operation execution instruction sent from the industrial internet of things user platform, and sending the monitoring operation instruction to the industrial internet of things perception and control platform; and monitoring, by the monitoring devices of the industrial internet of things perception and control platform, the production process based on the monitoring operation instruction to obtain the first data and upload the first data to the industrial internet of things service platform.

One or more embodiments of the present disclosure provide an industrial internet of things service information processing device based on a service cloud platform. The device comprises at least one processor and at least one memory; the at least one memory is configured to store computer instructions; the at least one processor is configured to execute at least part of the computer instructions to realize the above industrial internet of things service information processing method.

In some embodiments of the present disclosure, by determining corresponding service data based on application data, second data, etc., of different users, in combination with the privileges of the users as well as the importance of the data, etc., and then pushing the service data based on the user priorities, it can considers the privileges and preferences of different users to determine the service data that is more in line with actual needs, which in turn allows for the determination of more reasonable recommended operation data for subsequent more targeted monitoring of the production process.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, wherein.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor.

It should be understood that "system" and/or "device" as used herein is a method of distinguishing between different classes of components, elements, parts, sections, or assemblies. Words may be replaced by other expressions if other words accomplish the same purpose.

In general, the terms "including" and "comprising" suggest only the inclusion of clearly identified steps and elements, which do not constitute an exclusive list, and the method or device may also include other steps or elements.

Flowcharts are used in the present disclosure to illustrate operations performed by a system in accordance with embodiments of the present disclosure. It should be appreciated that the preceding or following operations are not necessarily performed in an exact sequence. Instead, steps can be processed in reverse order or simultaneously. Also, it is possible to add other operations to these processes or remove a step or steps from them.

Some embodiments of the present disclosure provide an industrial internet of things (IoT) service information processing system based on a service cloud platform and the method thereof, which can categorize data from different production lines and different users based on data from multiple industrial IoT subsystems, thereby balancing different users' needs and utilizing limited computing resources to provide more targeted services.

Figure 1:
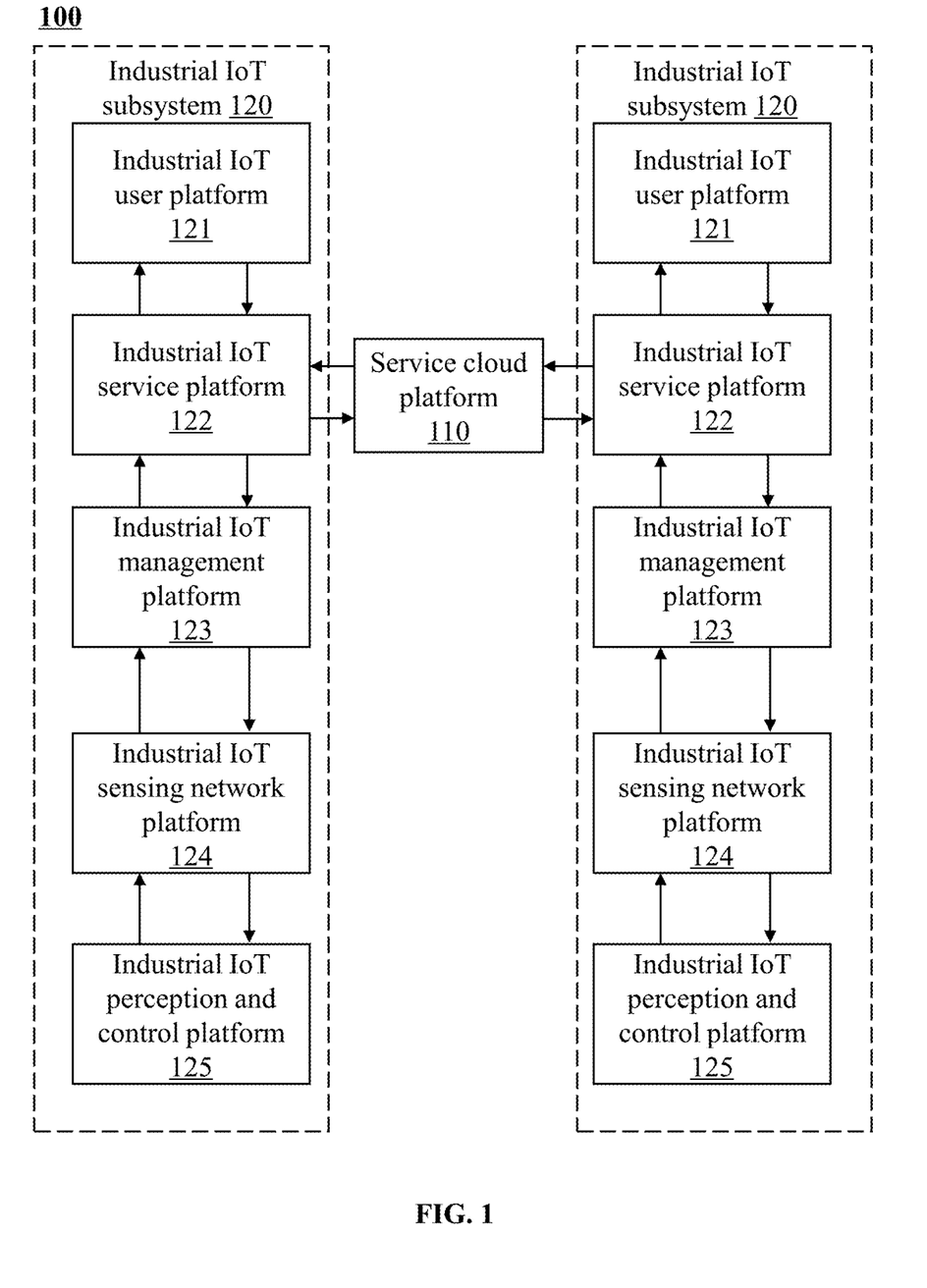
FIG. 1 is a system structure diagram of an industrial internet of things (IoT) service information processing system based on a service cloud platform shown according to some embodiments of the present disclosure.

FIG. 1 is a system structure diagram of an industrial IoT service information processing system based on a service cloud platform shown according to some embodiments of the present disclosure.

In some embodiments, the industrial IoT service information processing system 100 based on the service cloud platform may include at least one industrial IoT subsystem 120 and the service cloud platform 110. The industrial IoT subsystem 120 is a system for receiving recommended operation data and service data and generating and transferring application data and second data. In some embodiments, the industrial IoT subsystem 120 includes an industrial IoT user platform 121, an industrial IoT service platform 122, an industrial IoT management platform 123, an industrial IoT sensing network platform 124, and an industrial IoT perception and control platform 125.

The industrial IoT user platform 121 is a platform for interacting with users. In some embodiments, the industrial IoT user platform 121 is configured to receive the application data from the users, upload the application data to the industrial IoT service platform 122, and in response to receiving the service data, display the service data to the users.

In some embodiments, the industrial IoT user platform 121 may be a platform based on an electronic device such as a computer, a cell phone, or the like.

The industrial IoT service platform 122 is a platform for communicating with the service cloud platform 110. In some embodiments, the industrial IoT service platform 122 is configured to perform desensitization processing on first data to generate the second data, and upload the second data to the service cloud platform.

The industrial IoT management platform 123 is a platform for controlling the industrial IoT subsystem 120. In some embodiments, the industrial IoT management platform 123 is configured to determine a monitoring operation instruction based on the recommended operation data in response to receiving an operation execution instruction from the industrial IoT user platform and send the monitoring operation instruction to the industrial IoT perception and control platform.

The industrial IoT sensing network platform 124 is a network for data transmission in the industrial IoT subsystem 120. In some embodiments, the industrial IoT sensing network platform 124 is configured with a communication device or a server.

The industrial IoT perception and control platform 125 is a platform for monitoring and controlling a production process. In some embodiments, the industrial IoT perception and control platform 125 includes monitoring devices. The monitoring devices are devices configured to monitor a production process, which may include, for example, a current sensor, a gas metering device, or the like. In some embodiments, the monitoring devices are deployed in a production line and configured to monitor the production process based on a monitoring operation instruction to obtain the first data and upload the first data to the industrial IoT service platform.

In some embodiments, any one of the platforms in the industrial IoT subsystem 120 may be configured with a processor configured to execute program instructions to perform one or more of the functions described in the present disclosure. In some embodiments, the processor may comprise one or more sub processing devices. By way of example only, the processor may include a central processing unit (CPU), an application-specific integrated circuit (ASIC), an application-specific instruction processor (ASIP), a graphics processor (GPU), etc., or any combination of the above.

The service cloud platform 110 may be configured to manage resources and process data and/or information from at least one of its own components or an external data source (e.g., a cloud data center). In some embodiments, the service cloud platform 110 may be configured with a single server or a group of servers, and the group of servers may be centralized or distributed. In some embodiments, the service cloud platform 110 may be implemented on a cloud platform or provided virtually. By way of example only, the service cloud platform 110 may include a private cloud, a public cloud, a hybrid cloud, etc., or any combination thereof.

In some embodiments, the service cloud platform 110 may include an edge device, a central device, a service database, and a control center.

An edge device is a data processing device deployed in a production line. A central device is a data processing device deployed in the center of a system that communicates with the production line. In some embodiments, the edge device and the central device may include a server-dependent computer device. In some embodiments, the central device may communicate with terminal devices in the production line.

The service database is a database for storing data related to the industrial IoT subsystem. In some embodiments, the service cloud platform 110 may include a plurality of service databases deployed in an edge device and/or a central device, respectively.

The control center is a component for controlling a target computing terminal to perform computation and processing of data. In some embodiment, the control center is configured to determine calculation parameters based on the application data, control, based on a target database, a target computing terminal with the calculation parameters to perform following operations: determining the service data based on the second data and the application data; determining the recommended operation data based on the service data and the application data; and sending the recommended operation data and the service data to the industrial IoT service platform. The target computing terminal is an edge device or a central device for performing edge computing or remote computing.

In some embodiments, the edge device, the central device, and the control center may be configured with processors.

In some embodiments of the present disclosure, an enterprise can realize the interaction of a plurality of different industrial IoT subsystems through the service cloud platform to realize the conditional sharing of data from different industrial IoT and improve the overall production effect. The service cloud platform pushes the service data to the users based on different application data, which can improve the quality of service.

The above description of the industrial IoT service information processing system 100 based on the service cloud platform is provided only for descriptive convenience and does not limit the present disclosure to the scope of the cited embodiments. For a person skilled in the art, after understanding the principle of the system, it can be possible to arbitrarily combine the various platforms of the industrial IoT subsystem 120 or constitute a subsystem connected to other platforms without departing from this principle.

Figure 2:
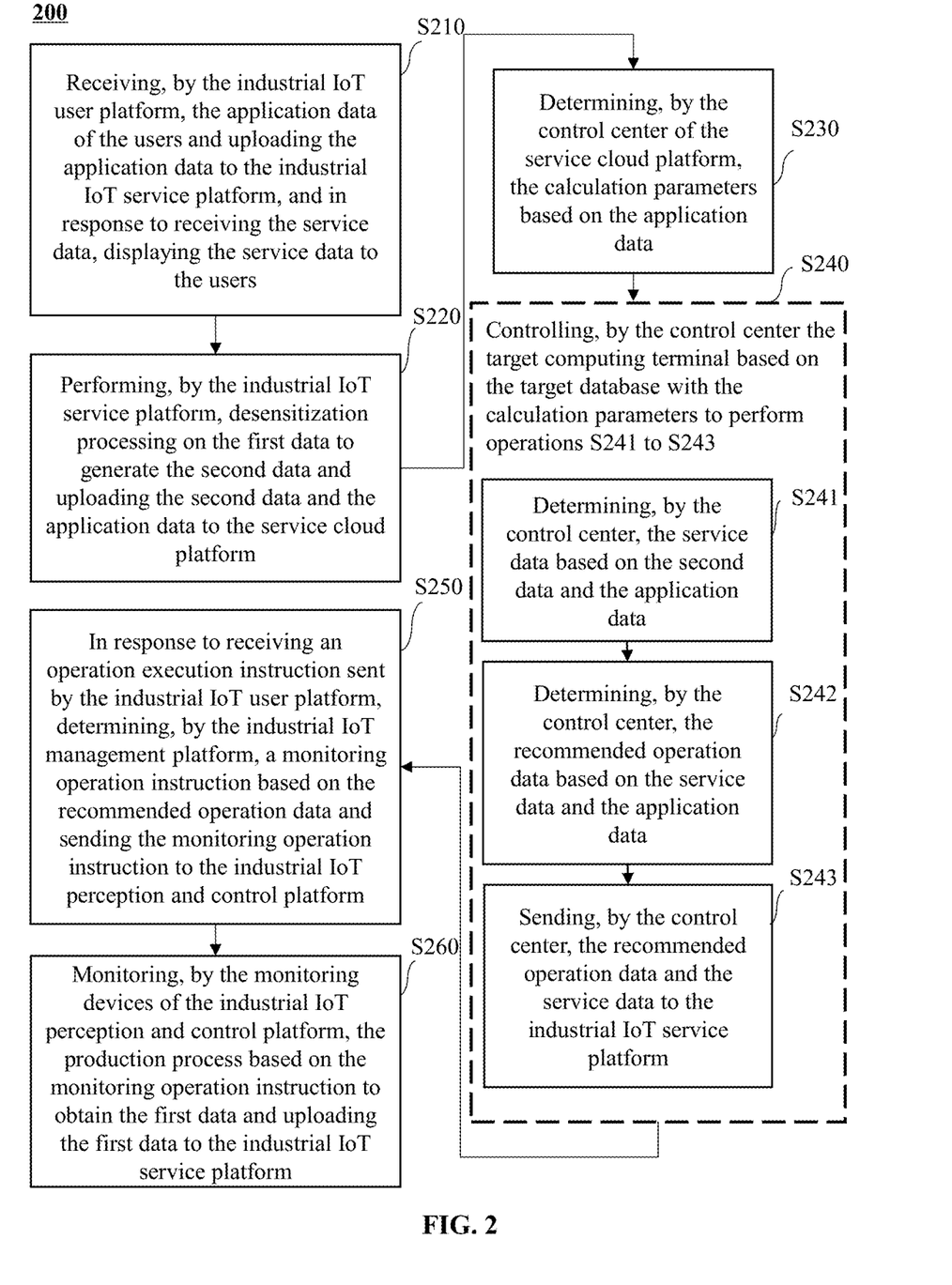
FIG. 2 is an exemplary flowchart of an industrial IoT service information processing method based on a service cloud platform shown according to some embodiments of the present disclosure.

FIG. 2 is an exemplary flowchart of an industrial IoT service information processing method based on a service cloud platform shown according to some embodiments of the present disclosure.

In some embodiments, the industrial internet of things user platform may receive the application data of the users, upload the application data to the industrial internet of things service platform, and in response to receiving the service data, display the service data to the users; the industrial internet of things service platform may perform desensitization processing on the first data to generate second data, and upload the second data and the application data to the service cloud platform; the control center of the service cloud platform may determine calculation parameters based on the application data; the control center controls, based on a target database, the target computing terminal with the calculation parameters to perform following operations: determining the service data based on the second data and the application data; determining recommended operation data based on the service data and the application data; and sending the recommended operation data and the service data to the industrial internet of things service platform; the industrial internet of things management platform may determine a monitoring operation instruction based on the recommended operation data in response to receiving an operation execution instruction sent from the industrial internet of things user platform, and send the monitoring operation instruction to the industrial internet of things perception and control platform; and the monitoring devices of the industrial internet of things perception and control platform may monitor the production process based on the monitoring operation instruction to obtain the first data and upload the first data to the industrial internet of things service platform.

As shown in FIG. 2, process 200 includes the following operations. In some embodiments, process 200 may be performed by an industrial IoT service information processing system. Operation S210, operation S220, operation S250, and operation S260 are performed by the industrial IoT subsystem, and operation S230 to operation S240 are performed by the service cloud platform.

Operation S210, the industrial IoT user platform receives the application data of the users and uploads the application data to the industrial IoT service platform, and in response to receiving the service data, displays the service data to the users.

The application data is data that the users apply to view. In some embodiments, the application data may include the user who makes the application, the type of data applied by the user, or the like. The type of data may be at least one of a product name of a production line, a production line output, a production line operation status, or the like. The production line operation status may include running, suspended, stopped, or the like.

In some embodiments, the industrial IoT user platform may receive the application data of the users through a terminal, a server, or the like used by the user, and upload the received application data of the users through a network to the industrial IoT service platform.

The service data is data provided to the users based on the application data. In some embodiments, the service data may include data of at least one data type provided to the users. In some embodiments, the service cloud platform may send the service data determined based on the application data to the industrial IoT service platform, which in turn sends the service data to the industrial IoT user platform.

In some embodiments, the industrial IoT user platform may display, in response to receiving the service data, the service data to the users. In some embodiments, the industrial IoT user platform may push the service data to the users based on the user priorities, see the related description of FIG. 4.

In some embodiments, the service data may also include data priorities of data types. In some embodiments, the industrial IoT user platform may determine a data display order of the data in the service data based on the data priority of the data in the service data; and display the service data to the users based on the data display order.

The data priority is an indicator that characterizes the importance of a data type, the larger the value of the indicator, the higher the importance of the data type. The data priority may be preset by a technician. In some embodiments, the data priority may also be determined based on a data level score, see the related description of FIG. 3.

The data display order is the order in which the data is displayed to the user.

In some embodiments, the industrial IoT user platform may sort the data of different data types in the service data from high to low data priority based on the data priorities in the service data and determine the sorted result as the data display order.

In some embodiments, the industrial IoT user platform may display data from the service data to the users in the data display order.

In some embodiments of the present disclosure, by setting corresponding data priorities for different data types, it may determine more reasonable data display order, which makes displaying the service data to the users in a more organized manner and improves the user experience.

Operation S220, the industrial IoT service platform performs desensitization processing on the first data to generate the second data and uploads the second data and the application data to the service cloud platform.

The first data is data generated during a production process. In some embodiments, the first data may include data of at least one data type.

The second data is the first data after desensitization. Desensitization processing is the process of data processing that prevents data leakage. In some embodiments, the desensitization processing may be implemented based on a desensitization function. For example, the industrial IoT service platform may utilize the desensitization function to truncate, encrypt, or hide the data of certain fields in the first data to achieve the desensitization processing.

Figure 3:
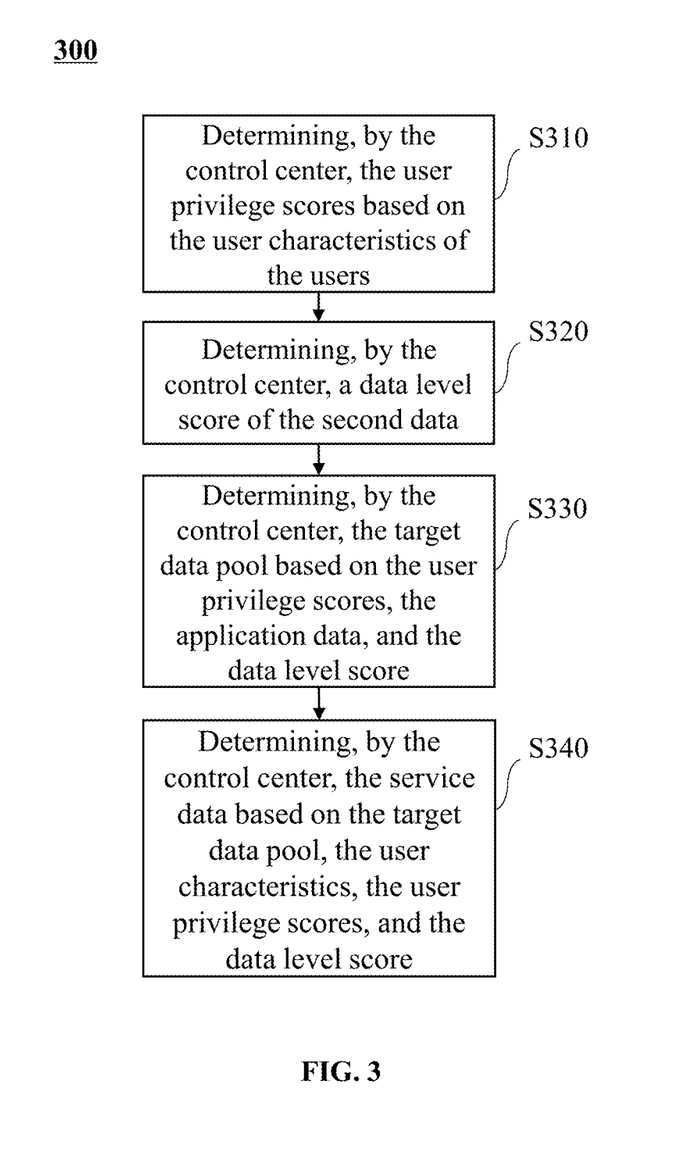
FIG. 3 is an exemplary flowchart illustrating a process for determining service data shown according to some embodiments of the present disclosure.

In some embodiments, the industrial IoT service platform sends, in response to receiving the application data uploaded by the industrial IoT user platform, the application data to the service cloud platform for subsequent processing, see operation S241 and the related description of FIG. 3.

In some embodiments, the industrial IoT service platform may send, in response to receiving the recommended operation data and the service data sent by the service cloud platform, the recommended operation data and the service data to the industrial IoT user platform.

Operation S230, the control center of the service cloud platform determines the calculation parameters based on the application data.

The calculation parameters are parameters characterizing the selected computation manner. In some embodiments, the calculation parameters may include at least one of edge computing and center computing. Edge computing is computing performed at or near a physical location of a user or a data source, away from a system center. Center computing is computing based on computer equipment of the communication center.

In some embodiments, the control center may determine the calculation parameters based on the application data in various ways. For example, the control center may determine the computational complexity based on the type of data applied by the user in the application data, determine the average response time based on the historical data, and then determine the calculation parameters based on the computational complexity and the average response time, for example, the more the computational complexity, the longer the average response time, central computing is used; otherwise, edge computing is used.

Exemplarily, the control center may calculate the total number of data types in the application data, and the higher the total number, the higher the computational complexity. For users with the same data types for all application data, the control center may calculate an average response time based on the historical response time from submitting the application data to sending the service data, and then perform a of the computational complexity and the average response time; if the weighted average exceeds the preset computation threshold, adopt central computing, otherwise, adopt edge computing. The weight of the weighted average may be preset by a technician.

Operation S240, the control center controls the target computing terminal based on the target database with the calculation parameters to perform operations S241 to S243.

The target computing terminal is a terminal that performs computational processing. In some embodiments, the target computing terminal may be selected based on the calculation parameters. For example, if the calculation parameters are edge computing, the control center selects the edge device closest to the target database (physical distance) to perform the computation; if the calculation parameters are central computing, the control center selects the central device to perform the computation.

The target database is a database comprising historical data associated with the application data. In some embodiments, the control center may filter out the historical data corresponding to the type of data contained in the application data from the historical application service data and use the set of corresponding historical data of the user's satisfaction level meeting the user satisfaction standard as the target database. The satisfaction level of the user that exceeds the satisfaction level threshold is determined to be that the user's satisfaction level meets the user satisfaction standard. In some embodiments, the user's satisfaction level may be obtained based on feedback from the user, or based on the number of subsequent similar applications, as described in relation to FIG. 5.

Operation S241, the control center determines, based on the second data and the application data, the service data.

In some embodiments, the control center may determine the service data based on the second data and the application data in multiple ways. For example, the control center may consult, based on the user who makes the application in the application data, the data types that the user has historically consulted, and determine the intersection of the data types in the application data and the data types that the user has historically consulted as the data types included in the service data for the user, and then consult a value of the corresponding data type in the second data and use the value as the data of the corresponding data type in the service data.

Operation S242, the control center determines, based on the service data and the application data, the recommended operation data.

The recommended operation data refers to the relevant parameters of the monitoring devices that are recommended to be set. In some embodiments, the recommended operation data may include operation parameters of at least one monitoring device.

In some embodiments, the recommended operation data includes operation parameters of at least one monitoring device. In some embodiments, the operation parameters of the monitoring device may include at least one of a data uploading frequency and a data precision. The data precision may be represented by the number of decimal places.

In some embodiments, the operation parameters of the monitoring device may be preset default values before the user sends the operation execution instruction.

In some embodiments, the control center may determine the recommended operation data based on the service data and the application data in multiple ways. For example, if there is a large difference between the data types of the service data and the application data, e.g., there is a small intersection of the data types in the application data and the data types that the user historically has consulted, the control center may increase, based on the preset magnitude, the data uploading frequency, data precision, etc. for each data type provided to the users.

Exemplarily, the application data of the user contains data types A, B, and C. Data type A is data of the upstream production line, and the user does not have access to it, and the data types of the service data contain data types B and C, which are data of the downstream production line, and the user may derive, on the basis of the data of the downstream production line, the value of data type A. At this time, the control center improves the data precision and the data uploading frequency of the monitoring devices, so that users can make more accurate calculations.

Operation S243, the control center sends the recommended operation data and the service data to the industrial IoT service platform.

Operation S250, the industrial IoT management platform determines, in response to receiving an operation execution instruction sent by the industrial IoT user platform, a monitoring operation instruction based on the recommended operation data and sends the monitoring operation instruction to the industrial IoT perception and control platform.

The operation execution instruction is an instruction that allows for the adoption of the recommended operation data. In some embodiments, the users may send the operation execution instruction via the industrial IoT user platform after obtaining the recommended operation data and the service data.

The monitoring operation instruction is an instruction configured to direct the operation of the monitoring devices.

In some embodiments, the industrial IoT management platform may determine, in response to receiving an operation execution instruction from the industrial IoT user platform, a monitoring operation instruction based on the recommended operation data in multiple ways. For example, the industrial IoT management platform may obtain, in response to receiving the operation execution instruction, the recommended operation data from the industrial IoT service platform, and based on the operation parameters included in the recommended operation data, determine the operation parameters of the monitoring devices in the currently controlled industrial IoT subsystem as a monitoring operation instruction, and send the monitoring operation instruction to the industrial IoT perception and control platform.

Operation S260, the monitoring devices of the industrial IoT perception and control platform monitors the production process based on the monitoring operation instruction to obtain the first data and upload the first data to the industrial IoT service platform.

In some embodiments, the monitoring devices of the industrial IoT perception and control platform monitors a production process by applying the operation parameters of the monitoring devices to the corresponding monitoring devices based on the monitoring operation instruction.

In some embodiments, the industrial IoT perception and control platform may monitor the production process based on the monitoring device to obtain the first data and upload the first data to the industrial IoT service platform.

In some embodiments of the present disclosure, the overall production efficiency can be improved by realizing interaction with a plurality of different industrial IoT systems through the service cloud platform, and at the same time, by determining, based on the different second data and the application data, the service data, and then determining the recommended operation data, the user experience can be improved by improving the overall data quality.

FIG. 3 is an exemplary flowchart for determining service data shown according to some embodiments of the present disclosure. As shown in FIG. 3, process 300 includes the following operations. In some embodiments, the process 300 may be performed by a control center.

In some embodiments, the control center is further configured to: determine user privilege scores based on user characteristics of the users; determine a data level score of the second data; determine a target data pool based on the user privilege scores, the application data, and the data level score; and determine the service data based on the target data pool, the user characteristics, the user privilege scores, and the data level score.

Operation S310, the control center determines the user privilege scores based on the user characteristics of the users.

The user characteristics are data reflecting identities or habits of the users.

In some embodiments, the user characteristics may include a job title level, a historical decision-making characteristic, a type of managed production line, or the like. The job title level may be represented by an integer, the larger the value, the higher the job title level.

Historical decision-making characteristic may be characterized by the average number of data types for which the user has historically made decisions. For example, if a user has historically made decisions by generally looking at two data types of data, the historical decision-making characteristic of the user is 2.

The type of managed production lines may include automatic, non-automatic, semi-automatic, or the like.

The user privilege score is data that characterizes a privilege level of the user, and the higher the value of a user privilege score, the more types of data the user may access.

In some embodiments, the control center may determine user privilege scores based on the user's user characteristics in multiple ways. For example, the control center may use the job title level in the user characteristics as a base value, and if the job title level is the highest level, the job title level may be directly used as the user privilege score for the user, and if the title level is not the highest level, the base value may be increased based on the historical decision characteristic, the types of production lines managed, etc. The value of the historical decision-making characteristic is larger and the type of managed production line is more inclined to non-automatic, the increased amount is higher.

Operation S320, the control center determines a data level score of the second data.

The data level score is data that reflects the importance of the data type. The higher the data level score corresponding to the data type, the higher the privilege level of the user required.

In some embodiments, the data level score includes a level corresponding to at least one data type in the second data. In some embodiments, the granularity of the data level scores and the user privilege scores need to be aligned.

In some embodiments, the control center may determine a data level score of the second data in multiple ways. For example, for a data type of the second data, the control center may use the grade of the production line in which the second data is located as the base value, and if the grade of the production line is the highest, the control center may directly use the base value as the data level score, and if the production line grade is not the highest, the control center may increase the base value based on the relative importance of the data type. The greater the value of the relative importance, the higher the increased amount. The grade of the production line may be artificially preset to characterize the importance of that production line.

In some embodiments, the relative importance may be determined based on the number of times for which the data type has been accessed, and the average user privilege score of the users accessing the data type. Exemplarily, the control center may determine the relative importance $X_{i,j}$ of the data type i under the production line j based on the following formula (1):

$$X_{i,j} = \frac{C_{i,j} * Y_{i,j}}{\sum_{j=1}^{m} C_{i,j} * \sum_{i=1}^{n} \frac{Y_{i,j}}{n}} \quad (1)$$

Where i=1, 2, . . . , n, n denotes the data type, j=1, 2, . . . , m denotes the production line, $C_{i,j}$ denotes the number of data accesses of data type i in production line j, and $Y_{i,j}$ denotes the average user privilege score of the users who have consulted data type i in the production line j.

Operation S330, the control center determines the target data pool based on the user privilege scores, the application data, and the data level score.

The target data pool is a collection of data that the user can access. In some embodiments, for the same data type, data with different data uploading frequencies and data precision may be stored in a plurality of copies, and the target data pool may be a database containing data with all data precision and all data uploading frequencies.

In some embodiments, the control center may determine the target data pool based on the user privilege scores, the application data, and the data level score in multiple ways. For example, the control center may determine the data that matches the data level score of the second data in accordance with the user privilege scores of the user, take the intersection of the data types of the matched data and the application data as the corresponding data of the user, and take data set corresponding to all users currently making applications as the target data pool.

The data that matches the data level score of the second data determined according to the user privilege scores of the users is data in the second data that has a data level score less than or equal to the user privilege score.

Operation S340, the control center determines the service data based on the target data pool, the user characteristics, the user privilege scores, and the data level score.

In some embodiments, the control center may determine the service data based on the target data pool, the user characteristics, the user privilege scores, and the data level score in a variety of ways. For example, for each data type of a data set corresponding to a user in the target data pool, the control center may count the number of times that the data type occurs concurrently in the historical service data, take the top N data types with the highest number of times as the relevant data types for the data type, count the data types with data level scores smaller than the user privilege scores among the relevant data types of all data types of the data set corresponding to the user in the relevant data set of the user, and determine the data of the data set corresponding to the user in the target data pool and the relevant data set of the user as the service data corresponding to the user. N may be positively correlated with the difference between the number of historical decision-making characteristic in the user characteristics and the number of data types in the target data pool.

In some embodiments, the control center is further configured to determine the service data based on the target data pool, the user characteristics, the user privilege scores, the data level scores, and the application data via a service data model.

The service data model is a model for determining the service data. In some embodiments, the service data model may be a machine learning model. For example, the service data model can be a Neural Networks (NN) model. In some embodiments, the inputs to the service data model may include the target data pool, the user characteristics, the user privilege scores, the data level scores, and the application data, and the outputs of the service data model may be the service data.

In some embodiments, the service data model may be obtained based on a large number of training samples with training labels.

The training samples may be preferred historical data from historical data, including sample target data pools, sample user characteristics corresponding to sample users, sample user privilege scores, sample application data, and sample data level scores corresponding to sample second data. Preferred historical data refers to historical data that has high user feedback satisfaction and no abnormality in the production line.

The training labels may be the actual historical service data of the sample user, which may be automatically labeled by the control center based on the historical data.

In some embodiments, the control center may input a large number of training samples into the initial service data model, construct a loss function based on the outputs of the initial service data model and training labels, and perform an iterative update on the initial service data model based on the loss function; and completing training until the value of the loss function satisfies an iteration completion condition. The iteration completion condition may include the loss function converging, the number of iterations reaching a threshold, etc.

In some embodiments of the present disclosure, by training based on the preferred historical data from the historical data, the more accurate service data model can be obtained, and by determining the service data through the service data model, the service data can be determined in a more efficient and accurate manner, improving the user experience.

In some embodiments, the inputs to the service data model may also include a production data sequence.

The production data sequence is a sequence composed of the second data uploaded to the service cloud platform during a preset time period. The preset time period refers to a period of time prior to the current time, which may be manually set.

In some embodiments, when the inputs to the service data model includes a production data sequence, the control center may add the sample production data sequence corresponding to the sample preset time period before the time corresponding to the sample second data into the training samples, and then train the service data model.

According to some embodiments of the present disclosure, by adding a production data sequence to the inputs to the service data model, real-time change information for the production line can be provided, enabling more accurate service data to be provided for production lines that change more rapidly in real time.

In some embodiments, the service data model has different learning rates for different training sample sets during training, and the learning rates for the training sample sets are related to historical incident rates of training sample sets.

The learning rate is a parameter used to control the magnitude of weight updates during the model training. In some embodiments, the learning rate is a parameter used in the training of the neural network, which may be any value of 0.0 to 1.0. The weight is a parameter used to calculate the relationship between the input samples and the output samples during the model training.

The historical accident rate is the frequency of historical accidents of the sample production line corresponding to the training sample. In some embodiments, accidents occurring on the production line may include the production line being empty, goods overflowing at the front end of the production line, or the like.

In some embodiments, the control center may divide the training samples into a plurality of training sample sets based on the range in which the historical accident rates of the training samples fall. For example, the control center may divide the historical accident rates into a plurality of ranges and divide the training samples into corresponding training sample sets based on the historical accident rates.

In some embodiments, the learning rates of the of training sample sets may be negatively correlated to the historical accident rates of the training sample sets, e.g., the larger the average historical accident rate of the training sample set, the smaller the corresponding learning rate. The larger the historical accident rate of the production line, the more potential impacts the production line involves in various aspects, the more important it is to learn the implied laws of the type of training samples, and the learning rate of the training samples may be appropriately reduced for the type of training samples.

In some embodiments of the present disclosure, by corresponding different training sample sets to different learning rates, the training of the service data model may be made more accurate, improving the ability of the service data model to deal with complex problems, and enabling the trained service data model to output more accurate service data.

In some embodiments of the present disclosure, by determining user privilege scores of users and a data level score of the second data, combining the application data to determine a target data pool, and then determining the service data, the security of the entire system can be safeguarded while ensuring that the service data can meet the user's data needs as much as possible within the limited privilege constraints.

It should be noted that the foregoing descriptions of the process 200 and the process 300 are for the purpose of exemplification and illustration only, and do not limit the scope of application of the present disclosure. For a person skilled in the art, various corrections and changes can be made to the process 200 and the process 300 under the guidance of this disclosure. These corrections and changes remain within the scope of this disclosure.

Figure 4:
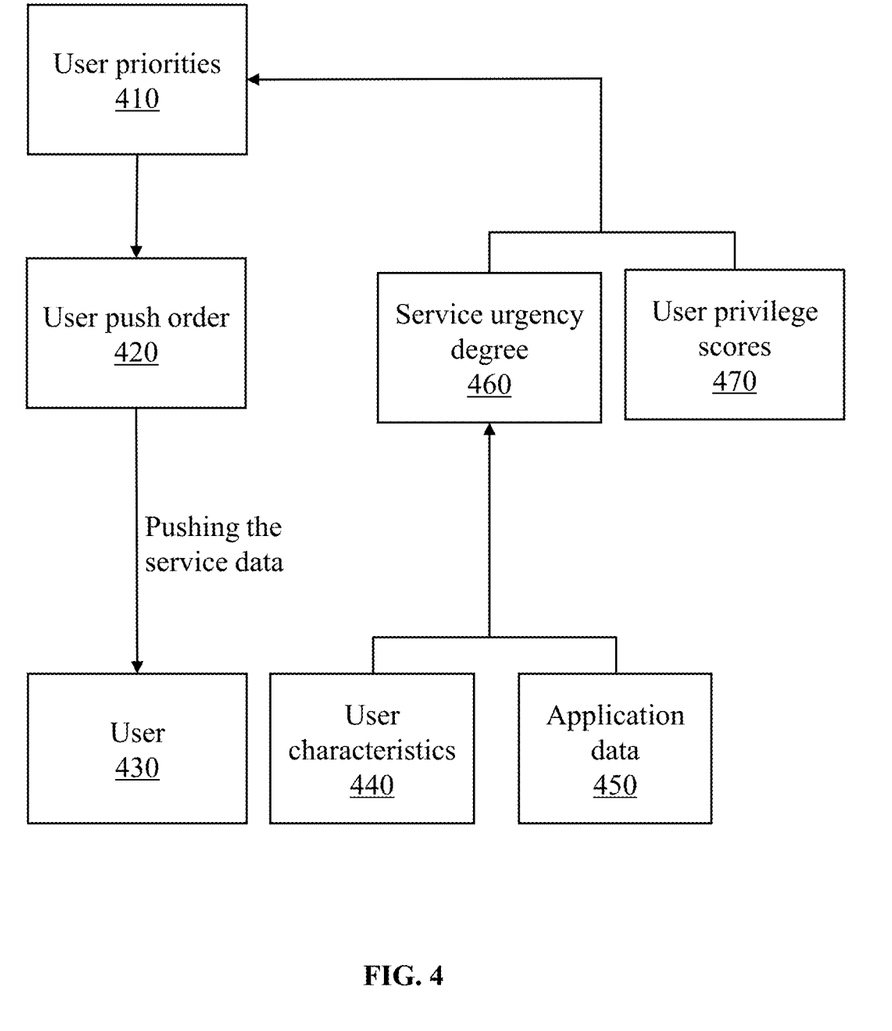
FIG. 4 is an exemplary schematic diagram for determining user priorities shown according to some embodiments of the present disclosure.

FIG. 4 is an exemplary schematic diagram for determining user priorities shown according to some embodiments of the present disclosure.

In some embodiments, as shown in FIG. 4, the industrial IoT user platform is further configured to: determine a user push order 420 based on the user priorities 410 in the service data; and push the service data to the user 430 based on the user push order 420.

The user priorities refer to the degree of priority of information processing corresponding to the users. In some embodiments, a batch of applications in the same time period contains the application data from multiple users, and a user priority corresponding to each user needs to be determined.

The user push order refers to the order in which the service data is pushed to the user.

In some embodiments, the control center may determine the user push order based on the user priorities in the service data in a variety of ways. For example, the control center may sort the users from high to low according to the user priorities as the user push order.

In some embodiments, the control center may push the service data to the user sequentially based on the user push order.

In some embodiments, the control center is further configured to: determine a service urgency degree 460 based on the user characteristics 440 of users and the application data 450; and determine the user priorities 410 based on the service urgency degree 460 and the user privilege scores 470.

The service urgency degree is an indicator measuring the urgency of users applying for service.

In some embodiments, the control center may determine the service urgency degree based on the user characteristics of users and the application data in a variety of ways. For example, the control center may determine the service urgency degree based on the type of production line managed by the user and a relationship between the number of data types included in the application data and the historical decision-making characteristics in the user characteristics.

Exemplarily, the more automated the type of production line managed by the user, the faster the production line is likely to change; the more the number of data types included in the application data exceeding the historical decision-making characteristics of users, suggesting that the user may be more uncertain about how to make decisions. Therefore, if the type of the managed production line is more automated and the number of data types included in the application data exceeding the historical decision characteristics is more, the service urgency degree is higher.

In some embodiments, the service urgency degree may also be positively correlated to the service time cost.

Service time cost is the time cost of calling the data required by the service user.

In some embodiments, the control center may statistically count, based on the data types contained in the corresponding the application data of the user, the average call time of each data type based on the historical data and compute the sum of the average call time of each data type as the service time cost.

In some embodiments, the higher the service time cost, the higher the service urgency degree may be set.

In some embodiments of the present disclosure, by positively correlating the service urgency degree with the service time cost, it is possible to prioritize the processing of applications with a higher service time cost by taking into account the time cost of the data call to prevent the reduction in the efficiency of the data processing caused by the insufficiency of the computational resource.

In some embodiments, the service urgency degree is also positively correlated to the service timeliness loss, which is determined based on historical service data.

The service timeliness loss may reflect the expected loss due to service delay.

The historical service data may include historical actual service delay time and historical actual production loss. Service delay time is the time difference between the time when the service data is determined and the time when the application data is received, and the production loss may be characterized by the product of the reduced production during the service delay and the value of the unit of production.

In some embodiments, the control center may determine the service timeliness loss based on historical service data in a variety of ways. For example, the control center may use the service delay time as an independent variable, the corresponding production loss as a dependent variable, select multiple pairs of data for fitting to determine a service loss function, and then substitute the historical average service delay time into the service loss function to obtain the service timeliness loss.

In some embodiments, the higher the service timeliness loss, the higher the service urgency degree may be set.

In some embodiments of the present disclosure, increasing the service urgency degree for a user with a high service timeliness loss allows prioritized processing of applications of users that may cause greater loss, thereby improving user satisfaction level.

In some embodiments, the control center may determine the user priorities based on the service urgency degree and the user privilege scores in multiple ways. For example, the control center may set a higher user priority for a user with a higher service urgency degree and a higher user privilege score.

In some embodiments of the present disclosure, by dividing user priorities, tasks with a high service urgency degree can be given priority for processing, decisions of users with a high user priority tend to be more important, and the prioritized processing of the application data of the users can maintain the reliability of the overall decision-making of the system.

Figure 5:
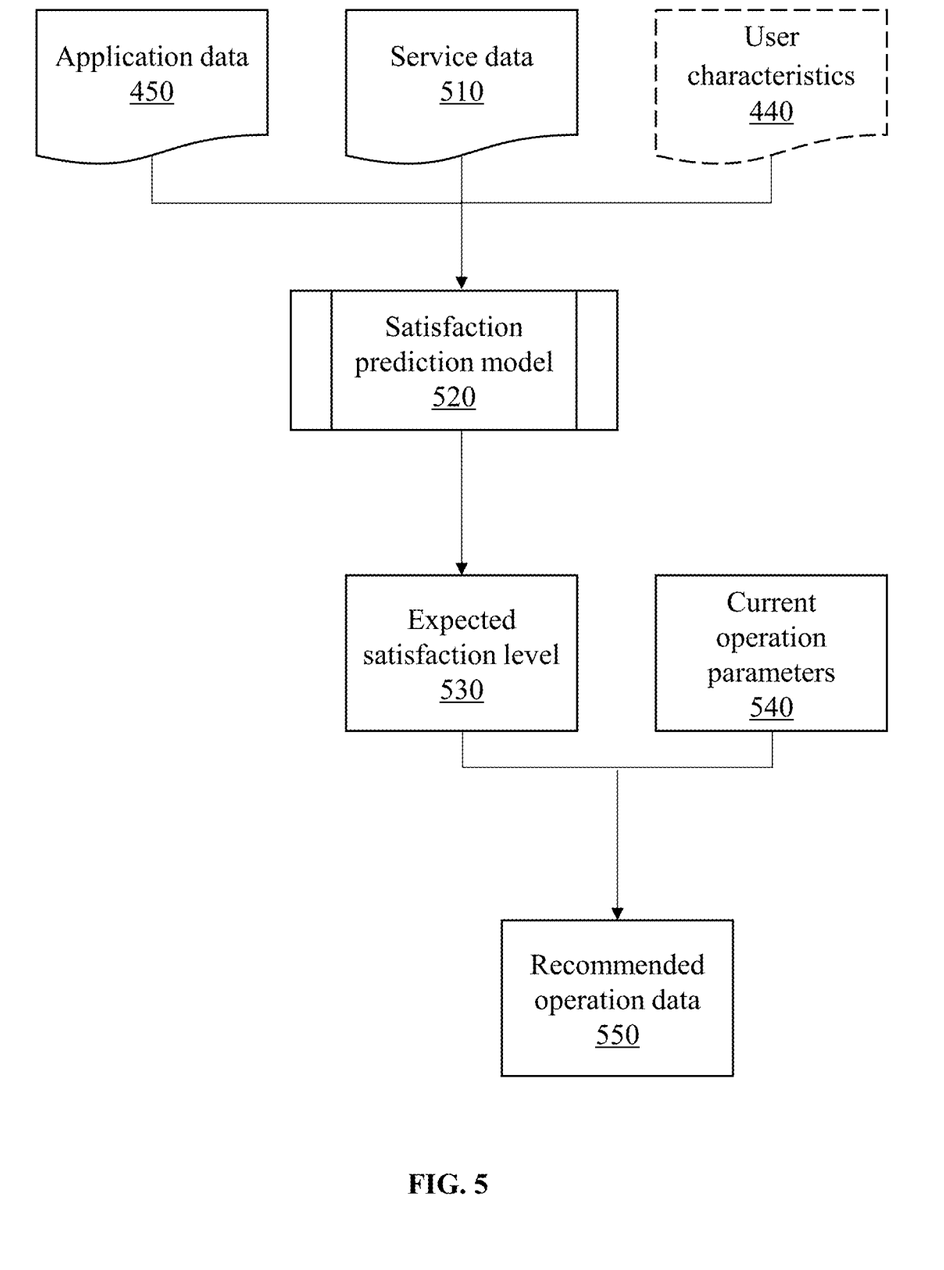
FIG. 5 is an exemplary schematic diagram for determining recommended operation data shown according to some embodiments of the present disclosure.

FIG. 5 is an exemplary schematic diagram for determining recommended operation data shown according to some embodiments of the present disclosure.

In some embodiments, as shown in FIG. 5, the control center is further configured to: determine an expected satisfaction level 530 of the users based on the service data 510 and the application data 450; and determine the recommended operation data 550 based on the expected satisfaction level 530 and current operation parameters 540 of the monitoring devices.

The expected satisfaction level is the data of predicted user's satisfaction level with the service data.

In some embodiments, the control center may determine the expected satisfaction level of the user based on the service data and the application data in multiple ways. For example, the control center may construct a feature vector based on the user's service data and the application data, match the feature vector in a standard database, take the standard vector with the highest similarity as a target vector, and determine the expected satisfaction level of the user based on the label corresponding to the target vector. The similarity may be calculated based on the cosine distance, the Euclidean distance, etc.

The standard database includes standard vectors and the corresponding labels, and the standard vectors are constructed based on the historical data, e.g., constructing the service data, the application data, and the subsequent actual satisfaction level in the historical data as vectors for clustering to form a preset number of clustering centers, constructing the service data and the application data corresponding to each of the clustering centers as standard vectors, and taking the subsequent actual satisfaction levels corresponding to the standard vectors as labels corresponding to the standard vectors.

In some embodiments, the actual subsequent satisfaction level may be determined by the number of subsequent similar applications made by the user, and the higher the number of made subsequent similar applications, indicating that the service data does not solve the user's problem, the lower the actual satisfaction level. For example, the control center may determine the reciprocal of a sum of the number of subsequent similar applications and 1 as the actual subsequent satisfaction level. The similar application refers to an application in which the overlap degree of data types in the application data is greater than an overlap threshold.

In some embodiments, the control center is further configured to determine, based on the service data 510 and the application data 450, the expected satisfaction level 530 through a satisfaction prediction model 520.

The satisfaction prediction model is a model for determining the expected satisfaction level. In some embodiments, the satisfaction prediction model may be a machine learning model. For example, the satisfaction prediction model may be a neural network model. In some embodiments, the inputs to the satisfaction prediction model may include the service data and the application data, and the output of the satisfaction prediction model may be the expected satisfaction level.

In some embodiments, the satisfaction prediction model may be acquired by training based on a large number of feature training samples with feature labels. The feature training samples may be sample service data and sample application data of the sample users in the historical data, and the feature labels may be the corresponding historical actual satisfaction level of the sample users. The historical actual satisfaction level is determined in a manner similar to that for determining the subsequent actual satisfaction level in the preceding section.

The satisfaction prediction model is trained in a similar way as the service data model, refer to the relevant description in FIG. 3.

In some embodiments of the present disclosure, by utilizing the satisfaction prediction model to determine the expected satisfaction level of the users, the users' satisfaction level can be more accurately predicted, so as to subsequently make more reasonable adjustments to the recommended operation data of the monitoring devices, thereby improving the user experience.

In some embodiments, the inputs to the satisfaction prediction model 520 may also include the user characteristics 440. See the corresponding description of FIG. 3 for the user characteristics.

In some embodiments, when the inputs to the satisfaction prediction model include the user characteristics, the control center may add sample user characteristics of the sample users to the feature training samples and then training the satisfaction prediction model.

In some embodiments of the present disclosure, by adding the user characteristics as inputs to the satisfaction prediction model, a more accurate expected satisfaction level can be determined by taking into account the user characteristics, to subsequently determine more accurate recommended operation data.

In some embodiments, the control center may determine the recommended operation data based on the expected satisfaction level and the current operation parameters of the monitoring devices in multiple ways. For example, if the expected satisfaction level of the user is less than a preset threshold, the control center may make adjustments to the monitoring devices corresponding to the current data type, for example, on the basis of the current operation parameters of the corresponding monitoring devices, appropriately adjusting the data uploading frequency and improving the data precision. The larger the difference between the expected satisfaction level and the preset threshold, the larger the adjustment. The current data types refer to the data types included in the current service data, and the corresponding monitoring devices refer to the monitoring devices for obtaining data of these data types.

When the user's expected satisfaction level is low, the monitoring devices may be adjusted to improve the data precision. In some embodiments of the present disclosure, by predicting the expected satisfaction level corresponding to the service data and making appropriate adjustments to the corresponding monitoring devices, more accurate data can be provided to improve the user's satisfaction level.

Some embodiments of the present disclosure further provide an industrial IoT service information processing device based on a service cloud platform. The device comprises at least one processor and at least one memory; the at least one memory is configured for storing computer instructions; and the at least one processor is configured for executing at least a portion of the computer instructions to implement the industrial IoT service information processing method based on the service cloud platform.

The basic concepts have been described above, and to a person skilled in the art, the foregoing detailed disclosure serves only as an example and does not constitute a limitation of this disclosure. There are various modifications, improvements, and amendments that may be made to this disclosure by those skilled in the art. These types of modifications, improvements, and amendments are suggested in this disclosure, and such modifications, improvements, and amendments remain within the spirit and scope of the exemplary embodiments of this disclosure.

Also, the disclosure uses specific words to describe embodiments of the disclosure. "Some embodiments" means a particular feature associated with at least one embodiment of the present disclosure. Some features of one or more embodiments of the present disclosure may be combined as appropriate.

While some embodiments of the invention that are presently considered useful are discussed in the foregoing disclosure by way of various examples, such details serve only an illustrative purpose, and additional claims are not limited to the disclosed embodiments; rather, the claims are intended to cover all combinations of embodiments that are consistent with the present amendments and equivalent combinations that are consistent with the substance and scope of the embodiments of this disclosure.

In an effort to simplify the presentation of the disclosure of this disclosure, and thereby aid in the understanding of one or more embodiments of the invention, the foregoing descriptions of embodiments of the disclosure sometimes combine a variety of features into a single embodiment, accompanying drawings, or description thereof. This method of disclosure does not imply that the objects of this disclosure require more features than those mentioned in the claims.

In some embodiments, the numerical parameters used in the disclosure are approximations, which can change depending on the desired characteristics of individual embodiments.

Finally, it should be understood that the embodiments described in this disclosure are only used to illustrate the principles of the embodiments of this disclosure. Other modifications may also fall within the scope of this disclosure. As such, alternative configurations of embodiments of the present disclosure may be considered to be consistent with the teachings of the present disclosure as an example, not as a limitation.

What is claimed is:

1. An industrial internet of things service information processing system based on a service cloud platform, wherein the system comprises an industrial internet of things subsystem and the service cloud platform; the industrial internet of things subsystem including an industrial internet of things user platform, an industrial internet of things service platform, an industrial internet of things management platform, an industrial internet of things sensing network platform, and an industrial internet of things perception and control platform; wherein the industrial internet of things user platform is configured to receive application data of users, upload the application data to the industrial internet of things service platform, and in response to receiving service data, display the service data to the users;

the industrial internet of things service platform is configured to perform desensitization processing on first data to generate second data, and upload the second data and the application data to the service cloud platform, the first data being data generated during a production process;

the service cloud platform includes an edge device, a central device, a service database, and a control center, and the control center is configured to:

determine calculation parameters based on the application data, the calculation parameters including at least one of edge calculation and center calculation;

control, based on a target database, a target computing terminal with the calculation parameters to perform operations including:

determining the service data based on the second data and the application data, the service data being data of at least one data type provided to the users;

determining recommended operation data based on the service data and the application data, the recommended operation data including operation parameters of monitoring devices, the operation parameters including at least one of a data uploading frequency and a data precision; and sending the recommended operation data and the service data to the industrial internet of things service platform;

the industrial internet of things management platform is configured to determine a monitoring operation instruction based on the recommended operation data in response to receiving an operation execution instruction sent from the industrial internet of things user platform, and send the monitoring operation instruction to the industrial internet of things perception and control platform; and the industrial internet of things perception and control platform includes the monitoring devices, and the monitoring devices deployed in a production line is configured to monitor the production process based on the monitoring operation instruction to obtain the first data and upload the first data to the industrial internet of things service platform; wherein the industrial internet of things user platform is further configured to:

determine data display order of data in the service data based on data priority in the service data; and display the service data to the users based on the data display order;

the control center is further configured to:

determine user privilege scores based on user characteristics of the users;

determine a data level score of the second data;

determine a target data pool based on the user privilege scores, the application data, and the data level score; and determine the service data based on the target data pool, the user characteristics, the user privilege scores, and the data level score.

2. The system of claim 1, wherein the service data further includes user priorities of the users, and the industrial internet of things user platform is further configured to:

determine a user push order based on the user priorities in the service data; and push the service data to the users based on the user push order;

the control center is further configured to:

determine a service urgency degree based on the user characteristics of the users and the application data; and determine the user priorities based on the service urgency degree and the user privilege scores.

3. The system of claim 1, wherein the control center is further configured to:

determine an expected satisfaction level of the users based on the service data and the application data; and determine the recommended operation data based on the expected satisfaction level and current operation parameters of the monitoring devices.

4. The system of claim 3, wherein the control center is further configured to:

determine, based on the service data and the application data, the expected satisfaction level through a satisfaction prediction model, the satisfaction prediction model being a machine learning model.

5. An industrial internet of things service information processing method based on a service cloud platform, wherein the method is performed by an industrial Internet of Things service information processing system, the method comprising:

receiving, by an industrial internet of things user platform, application data of users, uploading the application data to an industrial internet of things service platform, and in response to receiving service data, displaying the service data to the users;

performing, by the industrial internet of things service platform, desensitization processing on first data to generate second data, and uploading the second data and the application data to the service cloud platform, the first data being data generated during a production process;

determining, by a control center of the service cloud platform, calculation parameters based on the application data, the calculation parameters including at least one of edge calculation and center calculation;

controlling, by the control center, a target computing terminal, based on a target database, with the calculation parameters to perform operations including:

determining the service data based on the second data and the application data, the service data being data of at least one data type provided to the users;

determining recommended operation data based on the service data and the application data, the recommended operation data including operation parameters of monitoring devices, the operation parameters including at least one of a data uploading frequency and a data precision; and sending the recommended operation data and the service data to the industrial internet of things service platform;

determining, by an industrial internet of things management platform, a monitoring operation instruction based on the recommended operation data in response to receiving an operation execution instruction sent from the industrial internet of things user platform, and sending the monitoring operation instruction to an industrial internet of things perception and control platform; and monitoring, by the monitoring devices of the industrial internet of things perception and control platform, the production process based on the monitoring operation instruction to obtain the first data and upload the first data to the industrial internet of things service platform; wherein in response to receiving service data, the displaying the service data to the users includes:

determining data display order of data in the service data based on data priority in the service data; and displaying the service data to the users based on the data display order; and the determining the service data based on the second data and the application data includes:

determining user privilege scores based on user characteristics of the users;
determining a data level score of the second data;
determining a target data pool based on the user privilege scores, the application data, and the data level score; and
determining the service data based on the target data pool, the user characteristics, the user privilege scores, and the data level score.

6. The method of claim 5, wherein the service data further includes user priorities of the users, and the method further comprising:
determining, by the industrial internet of things user platform, a user push order based on the user priorities in the service data; and
pushing, by the industrial internet of things user platform, the service data to the users based on the user push order;
determining, by the control center, a service urgency degree based on the user characteristics of the users and the application data; and
determining, by the control center, the user priorities based on the service urgency degree and the user privilege scores.

7. The method of claim 5, wherein the determining recommended operation data based on the service data and the application data includes:
determining an expected satisfaction level of the users based on the service data and the application data; and
determining the recommended operation data based on the expected satisfaction level and current operation parameters of the monitoring devices.

8. The method of claim 7, wherein the determining an expected satisfaction level of the users based on the service data and the application data includes:
determining, based on the service data and the application data, the expected satisfaction level through a satisfaction prediction model, the satisfaction prediction model being a machine learning model.

* * * * *